US005210393A

United States Patent [19]

Shier

[11] Patent Number: 5,210,393

[45] Date of Patent: May 11, 1993

[54] ENGINE BLOCK HEATER

[75] Inventor: Richard K. Shier, Livonia, Mich.

[73] Assignee: General Motors Corporation, Detroit, Mich.

[21] Appl. No.: 777,696

[22] Filed: Oct. 8, 1991

[51] Int. Cl.[5] ........................... H05B 3/06; B60L 1/02

[52] U.S. Cl. ............................. 219/205; 123/142.5 B; 123/549; 219/523; 219/534; 219/536

[58] Field of Search ........................ 219/523, 205-208, 219/544, 536, 542, 534; 123/142.5 R, 142.5 L, 549

[56] References Cited

PUBLICATIONS

S. S. Schwartz, S. H. Goodman, "Plastics Materials and Processes," Van Nostrand Reinhold Company, pp. 533-535, 554-557, 865-869 (1982).

*Primary Examiner*—Anthony Bartis
*Attorney, Agent, or Firm*—Gordon F. Belcher

[57] ABSTRACT

An engine block heater is for an engine block having passage walls which define a fluid passage. The engine block has a heater socket which extends from the outer surface of the engine block toward its interior. The heater socket is separated from the fluid passage by the passage walls. The engine block heater comprises a heater housing having an exterior heating surface. The exterior surface has substantially the same shape as the heater socket enabling insertion of the heater housing into the heater socket and substantial heat transfer contact between a substantial portion of the exterior heating surface and the heater socket. A connector mounting is attached to the heater housing. The connector mounting is adapted for connection to an electrical power source. The heater housing has a heating element therein which can be heated by electrical connection of the electrical power source to the connector mounting enabling the heater housing to transfer heat to the engine block. A quick-release fastener is attached to the heater housing for releasable connection of the heater housing to the outer surface of the engine block.

2 Claims, 1 Drawing Sheet

ENGINE BLOCK HEATER

TECHNICAL FIELD

This invention relates to an engine block heater which can be releasably connected to an engine block, and more particularly to an engine block heater which extends into the interior of the engine block without extending into any of the fluid passages in the engine block.

BACKGROUND

An engine block heater is often used to warm an engine after it has been shutdown for some time in cold surroundings. Easy assembly and disassembly of the engine block heater and the engine block is desirable. Also, it is desirable for the engine block heater to be separated from the fluid passages in the engine block by the walls of the engine block.

SUMMARY OF THE INVENTION

The present invention provides an engine block heater for an engine block having passage walls which define a fluid passage. The engine block has a heater socket which extends from the outer surface of the engine block toward its interior. The heater socket is separated from the fluid passage by the passage walls.

The engine block heater comprises a heater housing having an exterior heating surface. The exterior surface has substantially the same shape as the heater socket enbabling insertion of the heater housing into the heater socket and substantial heat transfer contact between a substantial portion of the exterior heating surface and the heater socket. A connector mounting is attached to the heater housing. The connector mounting is adapted for connection to an electrical power source. The heater housing has a heating element therein which can be heated by electrical connection of the electrical power source to the connector mounting enabling the heater housing to transfer heat to the engine block. The separation of the heater socket from the fluid passage reduces the dependence of heat transfer away from the engine block heater on the coolant in the engine.

A quick-release fastener is attached to the heater housing for releasable connection of the heater housing to the outer surface of the engine block. This facilitates assembly and disassembly of the engine block heater and engine block.

BRIEF DRAWING DESCRIPTION

In the drawings:

FIG. 1 is an exploded assembly view of an engine block heater of the present invention and an engine block; and FIG. 2 is a sectional plan view of the engine block heater and engine block of FIG. 1 showing the engine block heater inserted into the heater socket.

Corresponding reference characters indicate corresponding parts throughout the several views of the drawings.

DETAILED DESCRIPTION

Figure 1:
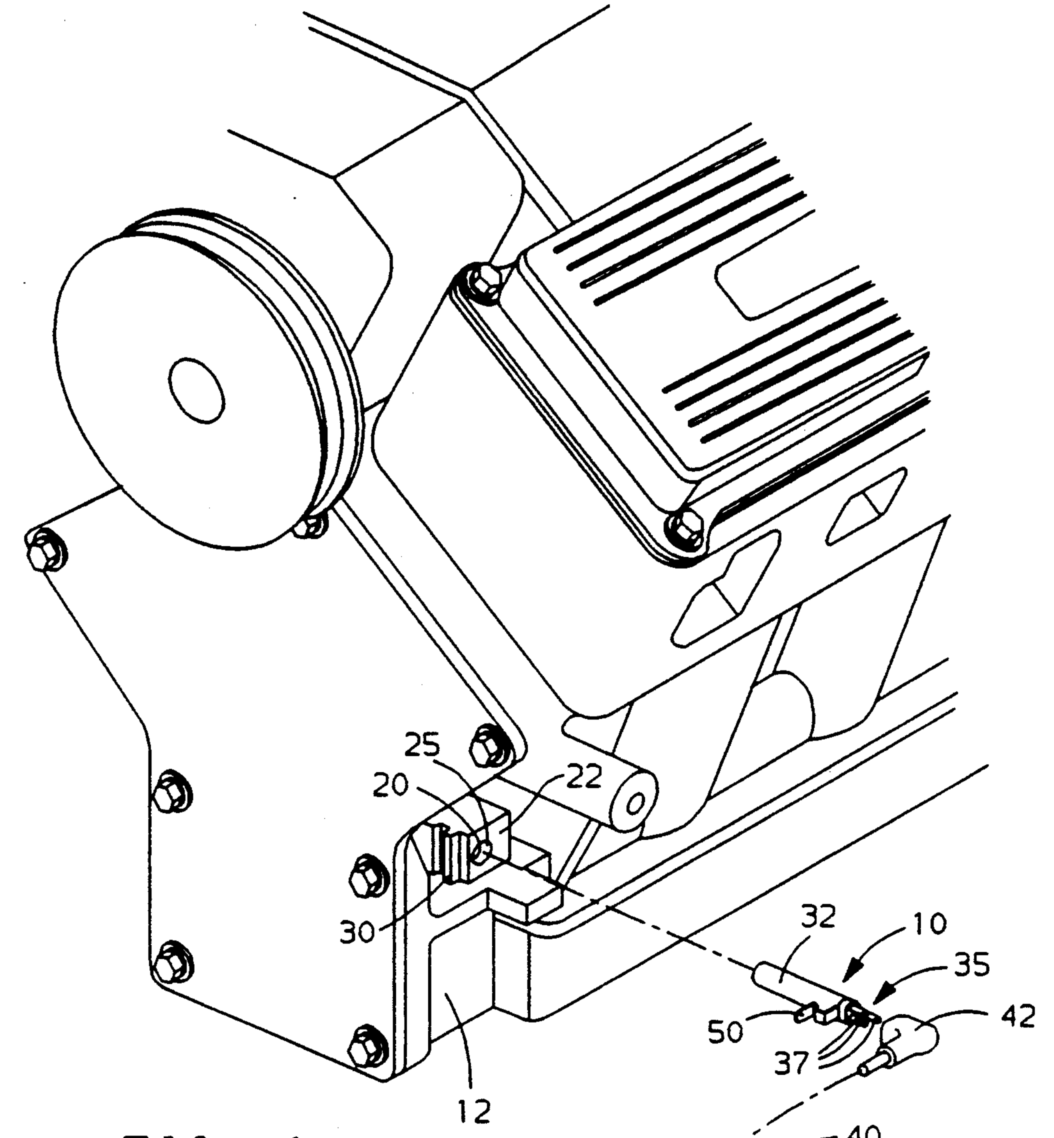
Figure 2:
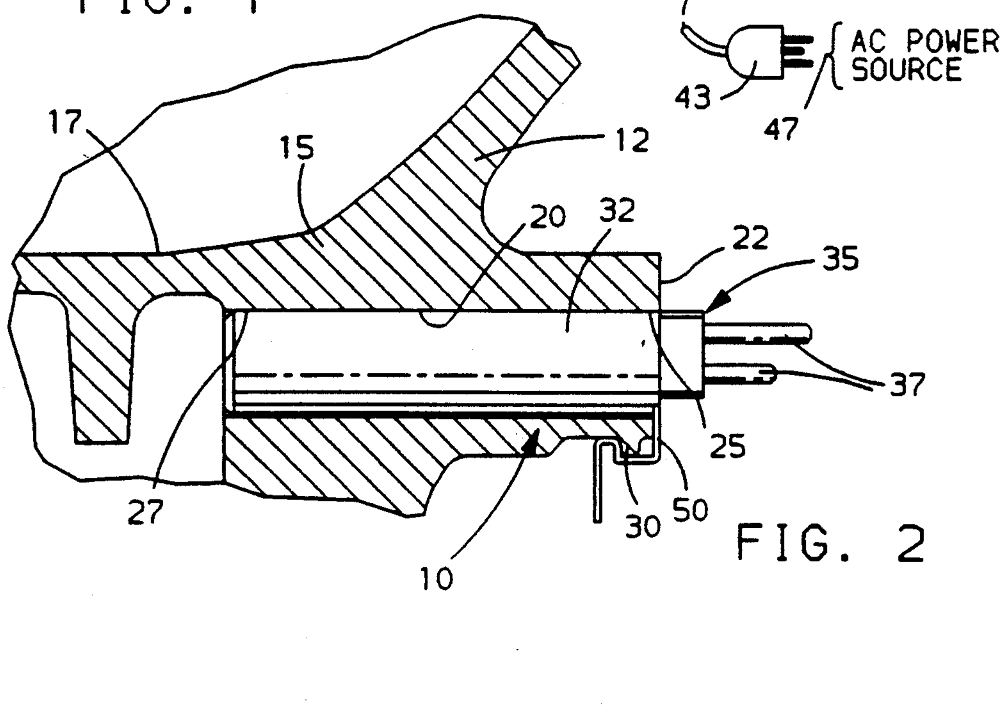

Referring to the drawings, numeral 10 generally refers to an engine block heater of the present invention for an engine block 12. The aluminum engine block 12 has passage walls 15 which define a fluid passage 17 such as the water jacket for an adjacent cylinder. The engine block 12 has an elongate cylindrical heater socket 20 which is cast and machined into the engine block 12. The heater socket 20 extends from the outer surface 22 of the side of the engine block 12 toward the interior of the engine block. The heater socket 20 is adjacent to and parallel to the rear surface of the engine block 12. The heater socket 20 is separated from the fluid passage 17 by the passage walls 15. The heater socket 20 has an open inlet end 25 and an open base end 27. The outer surface 22 of the engine block 12 has a machined fastener boss 30 adjacent to the inlet end 25.

The engine block heater 10 comprises a heater housing 32 having an elongate cylindrical exterior heating surface. The exterior heating surface has substantially the same shape as the heater socket 20 enabling insertion of the heater housing 32 into the heater socket 20. The clearance between the heater housing 32 and heater socket 20 is very small so that the heater housing closely fits in the heater socket. The heater housing 32 is formed by inserting a resistance wire in a metallic tube. The metallic tube is then filled with a thermally conductive, electrically insulative powder which surrounds the resistance wire. After the resistance wire and powder are inserted into the metallic tube, the metallic tube is closed and compressed by rolling to compact the powder around the resistance wire. Aluminum is then cast around the metallic tube and smoothed by machining.

The engine block heater 10 further comprises a connector mounting 35 attached to one end of the heater housing 32. The connector mounting 35 includes three conductive pins 37 extending from the heater housing 32. The engine block heater 10 further comprises a connector cable 40 having a connector cap 42 connected to one end. The connector cap 42 has a rubber cover and three sockets with each socket corresponding to a conductive pin 37 so that the connector cap can be electrically connected to the conductive pins. The remote end of the connector cable 40 has a plug 43 adapted for electrical connection to an electrical power source 47. This is typically accomplished by connecting one end of an electrical extension cord to the plug and the other end of the electrical extension cord to a socket which is energized by the electrical power source 47. The energized socket may be in the wall of a garage in which the vehicle is parked. The plug 43 and plug on the electrical extension cord each have three prongs which are each received into their respective sockets. The third prong on each of the plugs serves to electrically ground the engine block 12. The rubber cover on the connector cap 42 insulates the conductive pins 37 from moisture and dirt.

The engine block heater 10 also includes a quick release fastening means comprising a spring clip 50 attached to the heater housing 32.

The engine block heater 10 is assembled to the engine block 12 by first attaching the connector cap 42 to the conductive pins 37. The heater housing 32 is then inserted into the inlet end 25 so that when the heater housing 32 is completely inserted into the heater socket 20, the spring clip 50 is adjacent to the fastener boss 30. The fastener boss 30 is shaped so that the spring clip 50 can be snapped over it to retain the heater housing 32 in the heater socket 20. The spring clip 50 allows releasable connection of the heater housing 32 to the fastener boss 30 enabling the heater housing to be securely retained in the heater socket 20. Alternatively, the quick release fastening means may comprise a small bolt which securely retains the heater housing 32 in the heater socket 20. It is possible to attach the connector cap 42 to the conductive pins 37, to insert the heater housing 32 into the heater socket 20, and to snap the spring clip 50 to the fastener boss 30 all by hand. The connector cable 40 is secured to a bracket or other part of the engine compartment since the connector cable typically remains attached to the connector mounting 35 even when the engine block heater 10 is not in use.

The engine block heater 10 is typically activated prior to starting the engine after it has been shutdown for some time in cold surroundings. The engine block heater 10 is activated by opening the hood of the vehicle and electrically connecting the plug 43, using an extension cord, to a socket which is energized by the electrical power source 47. The plug 43 should be readily accessible once the hood of the vehicle is opened.

Connection of the electrical power source to the connector mounting 35 results in the resistance wire in the heater housing 32 becoming heated. This results in heating of the powder which is compacted around the resistance wire, which in turn causes the metallic tube and aluminum casing to be heated. This results in the exterior surface of the heater housing 32 becoming heated and transferring heat to the engine block 12. The substantially similar shapes of the exterior heating surface of the heater housing 32 and the heater socket 20 enables substantial heat transfer contact between a substantial portion of the exterior heating surface and heater socket. This facilitates heat transfer away from the engine block heater 10 and reduces the dependence of heat transfer away from the engine block heater on the coolant in the engine. This helps to limit the temperature of the engine block heater 10 thereby allowing the use of high quality, durable resistance wire.

The end of the heater housing 32 which adjoins the base end 27 is exposed to the surrounding air. The convective heat transfer between this portion of the heater housing 32 and the surrounding air is reduced because the base end 27 is in a shielded area in which the velocity of the air is very low.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. In combination, an engine block having passage walls which define a fluid passage, the engine block further having an integral heater socket which extends from the outer surface of the engine block toward its interior, the heater socket being separated from the fluid passage by the passage walls, and an engine block heater inserted in said socket, said heater comprising:

a heater housing having an exterior heating surface, said exterior surface having substantially the same shape as the heater socket enabling substantial heat transfer contact between a substantial portion of said exterior heating surface and the heater socket;

a connector mounting attached to said heater housing, said connector mounting being adapted for connection to an electrical power source, said heater housing having a heating element therein which can be heated by electrical connection of the electrical power source to said connector mounting enabling said heater housing to transfer heat to the engine block; and quick-release fastening means attached to said heater housing and engaging the outer surface of the engine block enabling said heater housing to be securely retained in the heater socket.

2. The combination set forth in claim 1 wherein said outer surface of said engine block has a fastener boss which is adjacent to said quick release fastening means, said fastener boss being engaged by said quick release fastening means to retain said heater housing in said heater socket.

* * * * *